July 1, 1958  F. G. GAY, JR., ET AL  2,840,821
SIDE SHIELD ATTACHMENT FOR GOGGLES AND SPECTACLES
Filed March 30, 1956
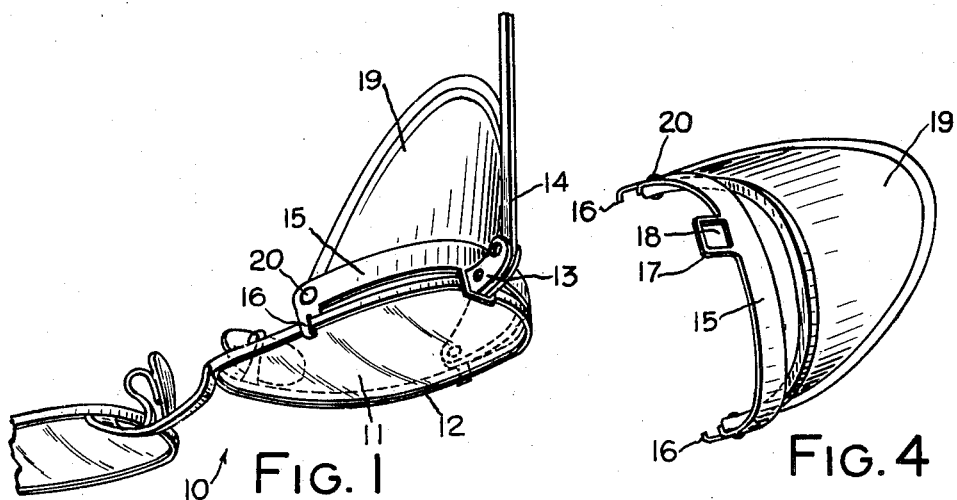
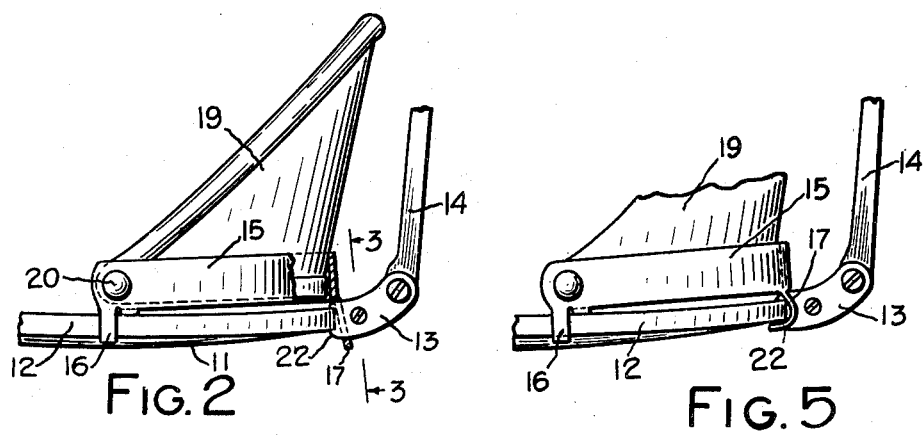
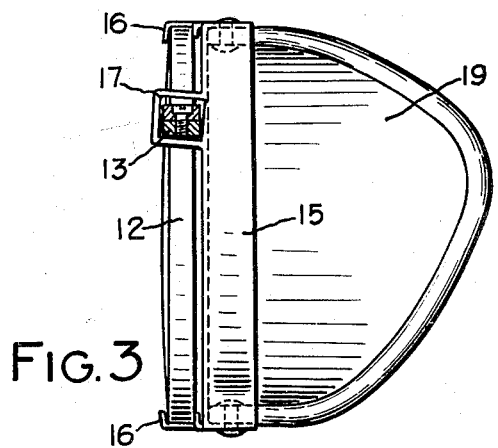
INVENTORS
FRED G. GAY JR.
AND
BY WALTER O. PARKER
ATTORNEY

United States Patent Office 2,840,821
Patented July 1, 1958

2,840,821

SIDE SHIELD ATTACHMENT FOR GOGGLES AND SPECTACLES

Fred G. Gay, Jr., Greece, and Walter O. Parker, Brighton, N. Y., assignors to Bausch & Lomb Optical Company, Rochester, N. Y., a corporation of New York Application March 30, 1956, Serial No. 575,087

1 Claim. (Cl. 2—13)

This invention relates to goggles and spectacles and more particularly it has reference to side shield attachments which may be detachably mounted rearwardly of the lenses of the goggle or spectacle in order to afford additional protection to the wearer from flying particles, harmful radiation, or the like which might otherwise strike the eye.

One of the objects of this invention is to provide an improved type of detachable side shield which will be simple in structure yet efficient in operation. A further object is to provide such a side shield which may be detachably secured to a goggle or spectacle and may be locked in position against accidental removal. Still another object is to provide a side shield which may be detachably secured to existing types of goggles and spectacles and is adapted to fit various sizes thereof. These and other objects and advantages reside in certain novel features of construction, arrangement and combination of parts and will hereinafter be more fully described and pointed out in the appended claim.

Referring to the drawings:

Fig. 1 is a fragmentary perspective view showing our improved side shield mounted on a goggle or spectacle.

Fig. 2 is a top plan view thereof with parts shown in section.

Fig. 3 is a sectional view taken on line 3—3 of Fig. 2.

Fig. 4 is a perspective view of the improved side shield.

Fig. 5 is a fragmentary top plan view of the side shield mounted on a goggle and showing the relation of the parts when the side shield is locked against accidental removal.

A preferred embodiment of our invention is disclosed in the drawings wherein 10 indicates, generally, a goggle or spectacle having a lens 11 held in a surrounding metallic eyewire or rim 12 which has at its temporal portion the laterally extending split endpiece 13 attached to adjacent ends of the rim 12 and pivotally supporting the temple 14 in a manner well known in the art. The side shield attachment comprises an arcuate, resilient support frame 15 which lies rearwardly of the lens rim 12 and extends partly along the upper portions of the rim 12 and down along the temporal and lower portions thereof. Extending forwardly from the respective ends of the support frame 15 are the integrally formed hooks 16 which are hooked over the adjacent portions of the rim 12. In order to more effectively retain the support frame 15 on the goggle 10, there is provided a loop member 17 which extends forwardly from the support frame 15 and has an opening 18 through which the laterally extending endpiece 13 projects. An arcuate shield member 19, formed of any suitable sheet material, has its respective end portions pivotally mounted on the end portions of the support frame 15 by means of rivets 20. The shield member 19 may be folded inwardly so that the temple 14 may be folded over the shield member.

To attach the side shield to a goggle or spectacle, the endpiece 13 is inserted in the opening 18 and the hooks 16 are then hooked over the front edge of the rim 12. If the temple is mounted on the endpiece 13, it is obvious, of course, that the temple end must be inserted into the opening 18 so that the loop member 17 may be brought down into engagement with the endpiece 13, as shown in Figs. 1–3. The side shield attachment may be removed by reversing the sequence of the steps. If it is desired to more securely lock the side shield on the goggle, the forwardly projecting portion of the loop member 17 may be bent down so as to engage the shoulder 22 formed at the junction of the endpiece 13 on the rim 12, as shown in Fig. 5.

From the foregoing, it will be apparent that we are able to attain the objects of our invention and provide an improved side shield which may be detachably secured to a goggle or spectacle of the type having a laterally projecting endpiece. Although we have shown the side shield attached to a goggle or spectacle having a lens rim, our improved shield could also be mounted equally well on a rimless type of spectacle having a laterally extending endpiece secured to the temporal portion of the lens and, in such case, the hooks 16 would hook over the adjacent edge of the lens. Since the support frame 15 is resilient, it may be fittted to goggles having lenses of different shapes and sizes. The shield member 19 may be formed of any suitable sheet material, such as plastic, and it may be perforated to provide ventilation. If made of light transmitting material, the shield member 19 may be suitably tinted or colored in order to prevent harmful radiation from reaching the wearer's eye. Various modifications may, obviously, be made without departing from the spirit of our invention as pointed out in the appended claim.

We claim:

In a goggle or the like, the combination of a rim surrounding a lens, an endpiece extending laterally from the temporal portion of the rim and having a shoulder at the front edge of the rim, an arcuate, resilient support frame extending along the upper and temporal portions of the rim and rearwardly thereof, a loop member secured to and projecting forwardly from the support frame, said loop member having an opening through which the endpiece projects, said loop member being bent over to engage said shoulder, hook means projecting forwardly from the support frame and hooked over the edge of the rim, and a side shield member mounted on the support frame whereby the side shield is detachably held on the goggle or the like.

References Cited in the file of this patent

UNITED STATES PATENTS

| 1,177,219 | Willson | Mar. 28, 1916 |
| 1,899,903 | Simon et al. | Feb. 28, 1933 |
| 1,914,931 | Tynan | June 20, 1933 |

FOREIGN PATENTS

| 72,623 | Netherlands | June 15, 1953 |